April 18, 1939. B. KUNTZ 2,154,513
GEAR SHIFTING ATTACHMENT
Filed May 10, 1938
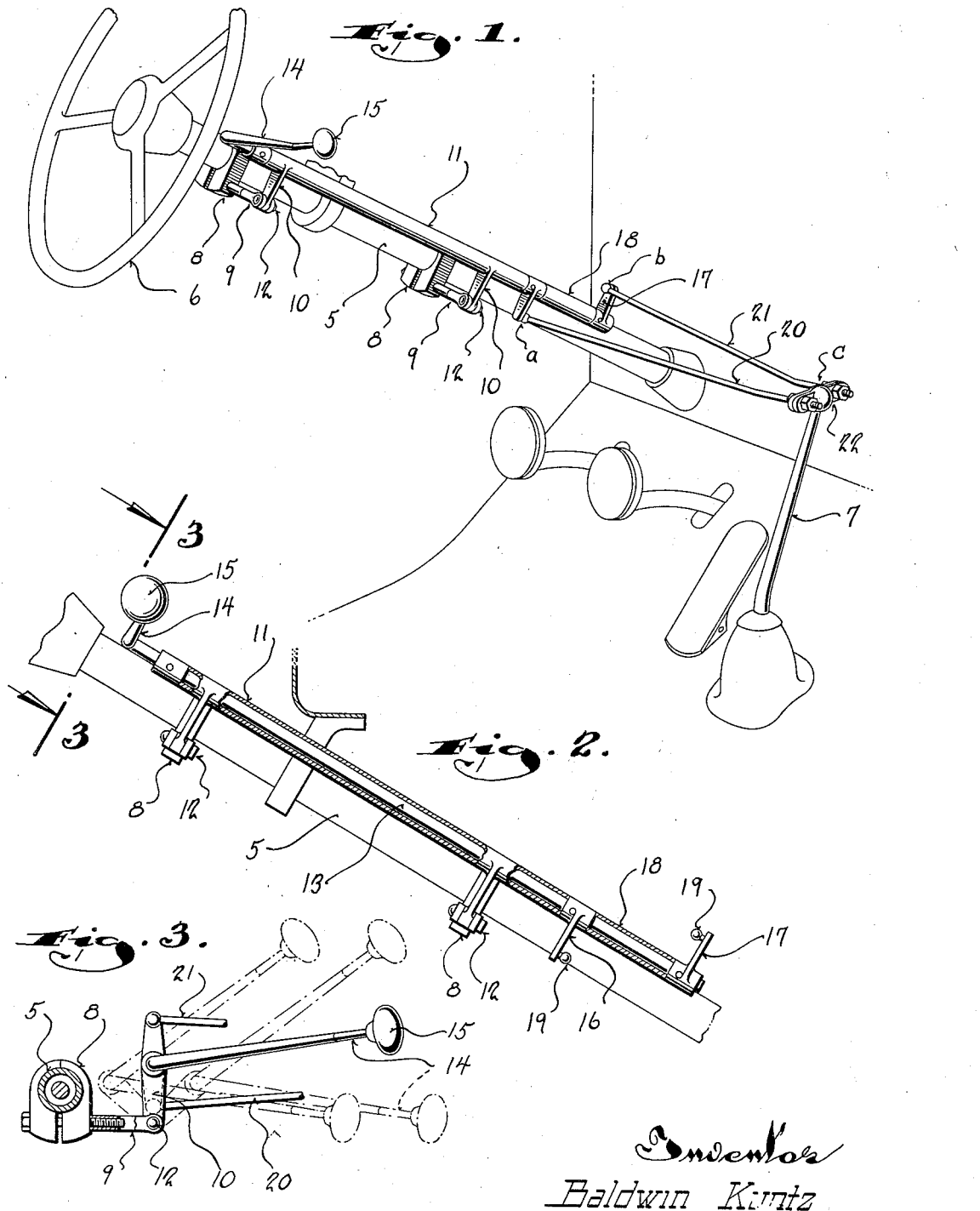

Patented Apr. 18, 1939

2,154,513

UNITED STATES PATENT OFFICE 2,154,513

GEAR SHIFTING ATTACHMENT

Baldwin Kuntz, Juneau, Wis.

Application May 10, 1938, Serial No. 207,030

6 Claims. (Cl. 74—473)

This invention relates to gear shifting devices for automobiles, and has as a general object to provide a convenient attachment whereby the conventional automobile may be equipped with gear shifting mechanism operable from a point adjacent to the steering wheel.

In the past there have been shifting mechanisms operable by handles adjacent to the steering wheel, but these past devices generally have been built into the vehicle as a part thereof, or have been so difficult to install, that they were not acceptable.

This invention therefore has as a further object to provide a device for the purpose described, which is extremely simple and capable of being quickly and easily attached to any automobile without necessitating reorganization of existing elements.

It is also an object of this invention to provide a gear shifting attachment of the character described which lends itself readily to economical manufacture.

With the above and other objects in view which will appear as the description proceeds, this invention resides in the novel construction, combination and arrangement of parts substantially as hereinafter described, and more particularly defined by the appended claims, it being understood that such changes in the precise embodiment of the herein disclosed invention may be made as come within the scope of the claims.

The accompanying drawing illustrates one complete example of the physical embodiment of the invention constructed in accordance with the best mode so far devised for the practical application of the principles thereof, and in which:

Figure 1 is a perspective view illustrating the application of this invention to a conventional automobile;

Figure 2 is a side view of the attachment, with parts thereof broken away and in section; and Figure 3 is a detail sectional view taken through Figure 2 on the plane of the line 3—3.

Referring now particularly to the accompanying drawing in which like numerals indicate like parts, the numeral 5 designates the steering column of a conventional automobile vehicle provided at its upper end with the usual steering wheel 6. A gear shift lever 7 is mounted in the customary manner and differs from the standard shift lever only in that it is considerably shorter and instead of being bent backward toward the seat, it is directed forwardly so as to be out of the way.

Clamped to the steering column 5 are two supporting members 8, and extending from each supporting member is an arm 9. The outer ends of these arms are preferably forked and receive therebetween the free ends of levers 10 fixed to a tube 11. Pins 12 pivotally join the arms 9 and 10 and as the axes of the pins 12 are aligned and the arms 10 are likewise in alignment, the tube 11 is mounted for bodily swinging movement with relation to the steering column toward and away from the axis of the neutral position of the gear shift lever 7.

It is preferable to mount these elements as shown in Figure 1, with the tube positioned substantially between the steering column and gear shift lever, although this specific arrangement may be varied if desired.

The tube 11 extends along the major length of the steering column and rotatably mounts a shaft 13 which projects from the upper and lower ends of the tube. A handle 14 is attached to the upper end of the tube and is so positioned that its knob 15 lies closely adjacent to the steering wheel 6 at a point where it may be conveniently grasped by the operator. The attachment of the handle 14 to the shaft limits downward movement of the shaft with respect to the tube.

Fixed to the lower end of the shaft directly beneath the tube is a downwardly directed lever 16 and secured to the lowermost end of the shaft at a distance from the lever 16 is a similar, but upwardly extending lever 17. For appearance, a short section of tubing 18 may be interposed between the hubs of the levers 16 and 17.

The free ends of these levers 16 and 17 carry balls 19 for ball and socket connections with links 20 and 21, respectively. The opposite ends of these links are connected to a socket member 22 which has a swivel connection with the outer ball-shaped end of the gear shift lever 7.

As best illustrated in Figure 2, the ball and socket connections between the levers 16 and 17 and the links 20 and 21, respectively, lie approximately in a horizontal plane and are spaced apart in a direction parallel to the longitudinal axis of the vehicle. Thus, a line joining the centers of these ball and socket joints, which for convenience have been designated points $a$ and $b$, forms the base of an isosceles triangle, the apex of which is at the center of the ball and socket connection between the links 20 and 21 and the gear shift lever, and has been designated point $c$. With the shifting device in its neutral position, and also when the tube is swung sidewise in one direction or the other which brings the gear shift lever in position for gear shifting motion either between "low" and "reverse" or "second" and "high", the line between the points $a$ and $b$ is on a plane common to the axis of the shaft.

When the shaft is oscillated, this line $a$—$b$ is swung into an angular position with respect to the shaft axis, carrying the apex point $c$ in an arc either forwardly or backwardly, depending upon the direction of rotation of the shaft. This motion carries the gear shift lever forwardly or backwardly to effect the desired shifting of the gears, but the gear shift lever being constrained to substantially straight line forward and backward movement (except when it is in its neutral position), such oscillation of the shaft to move the gear shift lever either forward or backward is accompanied by a slight bodily movement of the shaft and tube about the axes of the attaching pins 12.

As stated before, this same bodily movement of the shaft and tube about the axes of the pins 12, but in a greater amount, swings the gear shift lever sidewise to position the same for movement forward and backward between "low" and "reverse" and between "second" and "high".

The various positions of the shaft are illustrated in dotted lines in Figure 3, and it will be noted that the device is so constructed that the positions of the actuating knob 15 in effecting the desired shifting are in the same relationship as in conventional practice. In other words, to shift the gears into "low", the knob 15 is moved to the left and downwardly or toward the driver. The other positions are clear from the illustration in Figure 3.

From the foregoing description taken in connection with the accompanying drawing, it will be readily apparent that this invention provides a simple attachment capable of being applied to any automobile without in anywise altering its design or requiring extensive work in the installation, and one which may be sold at a comparatively low cost.

What I claim as my invention is:

1. In combination with an automobile having a steering wheel and column, and having a gear shift lever, means operable from a point adjacent to the steering wheel for actuating the gear shift lever comprising: a shaft alongside the steering column; means mounting the shaft on the steering column in a manner allowing bodily swinging motion thereof with relation to the steering column and oscillation of the shaft on its own axis; levers carried by the shaft and extending in opposite directions; and links connecting the outer ends of said levers with the gear shift lever.

2. In combination with an automobile having a steering wheel and column, and having a gear shift lever, means operable from a point adjacent to the steering wheel for actuating the gear shift lever comprising: a shaft; attaching clamps adapted to be mounted on the steering column; means supporting said shaft from the attaching clamps in a manner permitting oscillation of the shaft on its own axis and bodily swinging movement thereof; a handle having a part in juxtaposition to the steering wheel and connected with the shaft for imparting oscillation and swinging movement thereto; and connections between the shaft and the gear shift lever whereby said swinging movement of the shaft moves the gear shift lever sidewise and oscillation of the shaft moves the gear shift lever forwardly or backwardly.

3. In combination with an automobile having a steering wheel and column, and having a gear shift lever, means operable from a point adjacent to the steering wheel for actuating the gear shift lever comprising: a shaft; attaching clamps adapted to be mounted on the steering column; means supporting said shaft from the attaching clamps in a manner permitting oscillation of the shaft on its own axis and bodily swinging movement thereof; a handle having a part in juxtaposition to the steering wheel and connected with the shaft for imparting oscillation and swinging movement thereto; oppositely directed levers carried by the lower portion of the shaft occupying a substantially vertical plane passing through the axis of the shaft and its connection with the clamping brackets when the shaft is in its neutral position; and links connecting the outer ends of said levers with the gear shift lever so that said swinging movement of the shaft imparts sidewise movement to the gear shift lever and oscillation of the shaft moves the gear shift lever forwardly and backwardly.

4. In combination with an automobile having a steering wheel and column, and having a gear shift lever, means operable from a point adjacent to the steering wheel for actuating the gear shift lever comprising: spaced mounting members clamped to the steering column; a tube swingingly mounted from said members with the axis of the tube substantially parallel to the steering column and the tube bodily movable toward and from the axis of the neutral position of the gear shift lever; a shaft rotatable in said tube with the ends thereof projecting therefrom; a handle fixed to the upper end of the shaft and having a part disposed adjacent to the steering wheel whereby the shaft may be turned and swung sidewise toward and from the axis of the neutral position of the gear shift lever; oppositely directed levers carried by the lower end of the shaft occupying a position angular to a line extending from the gear shift lever to the shaft; and links connecting the free ends of said levers with the gear shift lever.

5. In combination with an automobile having a steering wheel and column, and having a gear shift lever, means operable from a point adjacent to the steering wheel for actuating the gear shift lever comprising: a shaft alongside the steering column; means mounting the shaft from the column for oscillation on its own axis and bodily swinging movement thereof; handle means adjacent to the steering wheel for imparting such motions to the shaft; a pair of links having a swivel connection with the gear shift lever and extending toward the steering column; and means carried by the shaft and joined to said links at points located on opposite sides of the axis of the shaft and with said points of connection spaced apart in a direction substantially parallel with the longitudinal axis of the vehicle when the shifting device is in neutral so that oscillation of the shaft actuates the links to move the gear shift lever forwardly and backwardly and swinging movement of the shaft moves the gear shift lever sidewise.

6. An accessory of the character described capable of being mounted as a unit on the steering column of an automobile for actuating the gear shift lever of the automobile comprising: a shaft; means for attaching the shaft to the steering column so that the shaft is free for oscillation on its own axis and for bodily swinging movement with respect to the steering column; means connecting the shaft with the gear shift lever and through which oscillatory and swinging movement of the shaft is translated into movement of the gear shift lever necessary to effect shifting of the gears; and a handle for the shaft positioned at the upper end of the steering column for imparting such movement to the shaft.

BALDWIN KUNTZ.